United States Patent Office 3,473,928
Patented Oct. 21, 1969

3,473,928
DIAZOTYPE PROCESS AND MATERIAL EMPLOYING AN OXAZOLINE SUBSTITUTED AROMATIC HYDROXYL COMPOUND AS COUPLER
Oskar Süs, Wiesbaden-Biebrich, and Heinz Schäfer, Wiesbaden-Sonnenberg, Germany, assignors, by mesne assignments, to Keuffel & Esser Company, Hoboken, N.J.
No Drawing. Filed Dec. 6, 1966, Ser. No. 599,360
Claims priority, application Germany, Dec. 11, 1965,
K 57,895
Int. Cl. G03c 1/58; C09b 29/00; C07d 85/44
U.S. Cl. 96—49
12 Claims

ABSTRACT OF THE DISCLOSURE

The diazotype process of the present invention makes use of a coupler of a basic heterocyclic ring of oxazoline attached to a mono or dihydroxyphenyl or naphthyl group with various other substituents in the phenyl or naphthyl group. This coupling compound when used with a diazotype material provides for greater storability of the diazotype material with the coupler of the present invention. The coupler of the present invention can also be used in an alkaline developing solution.

---

In diazotype processes hydroxyl compounds have proved suitable as azo components in which a basic heterocyclic ring is attached to an aromatic ring, e.g., a benzene or naphthalene ring. A diazotype process in which such compounds are used combines many advantages. Thus, images in strong colors are obtained which do not penetrate into the paper, are very resistant to water and relatively fast to light. Although the fact that these azo components couple rather readily with the diazo compounds customarily used in diazotype processes is desirable in some cases, it has the disadvantage that the storability of the diazotype material prepared with these compounds is limited. It is the object of the present invention to provide azo components of equaly good properties or similar properties but of reduced coupling activity, for a process for the preparation of a reproduction material which may be stored for a longer period of time between preparation and use without dyestuff formation by coupling.

An object of the present invention is to improve the known process just described in such a manner that copies are obtained in which a yellowing of the background areas is still more effectively eliminated.

Another object of the present invention is a diazotype process of the kind described in which a sheet coated with a diazo compound and the azo coupler component of the present invention will have a long shelf life and will produce copies and intermediate masters.

These and other objects are attained by using, as the azo component, a compound which corresponds to the following Formula A:

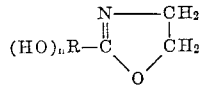

in which R stands for a benzene or naphthalene ring, and $n$ stands for 1 or 2, and in which R may have as substituents in addition to one or two hydroxyl groups and the oxazoline ring, alkyl and alkoxy groups or halogen.

Most of the compounds to be used as azo components according to the present invention are new. They are prepared by methods described in the technical literature for the preparation of arylated oxazolines. One may proceed, for instance, from the aromatic hydroxycarboxylic acid corresponding to the desired oxazoline compound, convert the carboxylic acid into the ethanol amide, exchange the aliphatic hydroxyl group for chlorine, e.g., by reaction with phosphorus(III)-chloride, and treat the product thus obtained with a weak alkali forming the oxazoline ring. The preparation of one of the oxazoline compounds is described in detail in Example 1 below.

Formulae 1 to 13 on the attached sheets are given as examples of compounds to be used as azo components according to the present invention. For further identification of the compounds, the melting points of the compounds and of the ethanol amides used as starting materials are also listed in the formula sheets.

The oxazoline compounds may, e.g., contain the following substituents in the aromatic ring R: methyl, ethyl, propyl, isopropyl, methoxyl or ethoxyl groups or chlorine or bromine.

The oxazoline compounds to be used according to the present invention provide for preparation of diazo copies with different color shades, the color shades depending upon the nature of the aromatic ring R and/or upon the number of hydroxyl groups present in the aromatic ring. Diazo copies with yellow color shades are obtained by using compounds in which the substituent R is a benzene ring and $n=1$. When two hydroxyl groups are present ($n=2$), reddish-yellow or reddish-violet dyestuffs are produced. If R is a naphthalene ring, the color deepens to a bluish-violet or a neutral blue shade. The process in which coupling components are used in which R stands for a naphthalene group, yields a particularly remarkable improvement in that it permits the production of a copying material which has a very good shelf-life and produces copies of a very intensive blue. If an azo component is added which forms a yellow dyestuff of good covering power with a diazo compound concerned, and the support used is transparent, copies are obtained which are very suitable as intermediate originals.

The components possess medium coupling energy, so that a two-component diazotype material of good shelf-like, which is suitable for dry development, may be produced. If suitable diazo compounds are chosen, in particular such of high coupling energy, the compounds may also be used for the preparation of diazo copies by the semi-wet process.

The azo compounds are of weakly basic nature and are more or less easily soluble in inorganic and organic acids. In the case of less soluble compounds it is of advantage to add organic polar solvents, preferably alcohols, to the aqueous solutions. The addition of organic solvents is necessary when a hydrophobic material, such as cellulose acetate, cellulose acetate-laminated paper, or polyester film, is used as the support. Any of the known supporting materials may be used for the process of the invention. Thus, opaque or transparent papers as well as plastic films may be used as supporting materials.

The azo components to be used according to the invention are compatible in the sensitizing solution with the additives customarily used in diazotype layers, such as anti-yellowing agents, acids or acid salts.

Suitable diazo compounds are such of high coupling energy, e.g., the diazo compounds derived from 1-amino-4-benzoylamino-2,5-diethoxybenzene,
1-amino-4[4'-ethoxy-phenyl]-2,5-diethoxybenzene,
1-amino-4-toluylmercapto-2,5-dimethoxybenzene,
1-amino-4-morpholino-2,5-dibutoxybenzene, and
1-amino-4-phenylamino-benzene, as well as the p-amino diazo compounds with a tertiary basic nitrogen atom conventionally used for the preparation of two-component layers, e.g., the diazo compounds derived from 1-amino-4-diethylamino-benzene,
1 - amino-4-(N-ethyl-N-β-hydroxyethyl-amino)-benzene, and
1-amino-4-morpholino-2,5-diethoxybenzene.

In the following examples, 1 part by volume is 1 ml., when 1 g. is used as the unit by weight. The formulae mentioned refer to the formula sheets attached.

Example 1

A photocopying base paper carrying a cellulose acetate layer on one surface is coated on the lacquered side with a solution of:

| | |
|---|---|
| Citric acid _____ parts by wt__ | 5.0 |
| Zinc chloride double salt of the diazo compound of 1-amino-2,5 - dibutoxy - 4 - morpholinobenzene parts by wt__ | 5.0 |
| Compound of Formula 8, the 2-[2'-hydroxy-naphthyl(3')]-oxazoline _____ parts by wt__ | 4.0 |
| Water _____ parts by vol__ | 30.0 |
| Isopropanol _____ do____ | 45.0 |
| Glycolmonomethyl ether _____ do____ | 15.0 |
| Formic acid _____ do____ | 5.0 |

The copying paper thus produced is distinguished by its good shelf-life. By exposure of the sensitized paper, followed by development with gaseous ammonia, a copy with neutral blue lines on a white background is obtained.

Alternatively, a transparent photocopying base paper provided on both sides with a cellulose acetate layer was used instead of the above-mentioned base paper. Copies with strong blue lines on a colorless background were obtained.

Equally good results are obtained when the compound corresponding to Formula 8 is replaced either by the compound corresponding to Formula 11, the 2-[2',8'-dihydroxy-naphthyl(3')]-oxazoline, or by the compound corresponding to Formula 12, the 2-[8'-methoxy-2'-hydroxy-naphthyl(3')]-oxazoline, or the compound corresponding to Formula 13, the 2-[6'-bromo-2'-hydroxy-naphthyl(3')]-oxazoline.

The compound corresponding to Formula 8 is prepared as follows:

First, 2-hydroxy-3-naphthoic acid ethanolamide is prepared by pouring 270 parts by volume of 30 percent aqueous ethanolamine solution onto 202 parts by weight of 2-hydroxy-3-naphthoic acid methylester (melting point 74° C.) and heating the mixture for 4 hours on an oil bath having a temperature of 130° C. A clear, yellow reaction mixture is formed to which 2000 parts by volume of water and 100 parts by volume of 32 pecent hydrochloric acid are added, whereupon the ethanolamide formed crystallizes out. The crystals are drawn off by suction and recrystallized from water for purification. Their melting point is at about 145–146° C.

The ethanolamide thus obtained is converted into the 2-hydroxy-3-naphthoic acid-β-chloroethylamide by suspending 23.1 parts by weight of 2-hydroxy-3-naphthoic acid ethanolamide (dried at 120° C.) in 250 parts by volume of benzene which is absolutely free from water and adding 14 parts by weight of thionyl chloride dropwise to the boiling suspension while stirring. Chlorination is completed by agitating the boiling suspension for six hours, hydrogen chloride escaping. The mixture is cooled, and the yellow precipitate which has formed is separated from the liquid by suction filtration and washed with petroleum ether. The melting point of the chloroethylamide thus obtained is 171° C.

For conversion into the 2-[2'-hydroxy-naphthyl(3')]-oxazoline, 13 parts by weight of the 2-hydroxy-3-naphthoic acid-β-chloroethyl amide are pulverized and added to a solution of 40 parts by weight of sodium acetate (anhydrous) in 100 parts by volume of water. Stirring is continued for 2 hours. During this time, the desired ring closure takes place and the oxazoline compound formed precipitates. The crude product is isolated by suction filtration and then purified by recrystallization from methanol with a small quantity of 10 percent sodium acetate solution added. The oxazoline compound thus produced is an almost colorless, well-crystallized product which melts at 154° C.

White photocopying base paper provided wtih a precoat of polyvinyl acetate and colloidal silicic acid is coated with a solution of:

| | |
|---|---|
| Citric acid _____ parts by wt__ | 4.0 |
| Boric acid _____ do____ | 3.0 |
| Thiourea _____ do____ | 4.0 |
| Sodium salt of naphthalene-1,3,6-trisulfonic acid parts by wt__ | 3.0 |
| Zinc chloride double salt of the diazo compound of 1-amino-2,5-diethoxy - 4 - morpholinobenzene parts by wt__ | 1.0 |
| Compound of Formula 6, the 2-(3',5'-dihydroxyphenyl)-oxazoline _____ parts by wt__ | 1.2 |
| Concentrated hydrochloric acid ____ parts by vol__ | 4.0 |
| Water _____ do____ | 100.0 |

With the diazo material thus obtained, copies with reddish-brown lines on a white background are produced.

When the above-mentioned diazo compound is replaced by the zinc chloride double salt of the diazo compound of 1 - amino - 4 - (N-ethyl-N-hydroxyethyl-amino)-benzene, diazo copies with deep brown colour shades are obtained, and if the zinc chloride double salt of the diazo compound of 1-amino-3-ethoxy-4-(N,N-diethylamino)-benzene is used, copies with violet-tinged red shades.

Equally good results are obtained when the compound corresponding to Formula 6 is replaced by the compound corresponding to Formula 5, the 2-(2',4'-dihydroxyphenyl)-oxazoline or the compound corresponding to Formula 7, the 2-(4'-bromo-3',5'-dihydroxyphenyl)-oxazoline.

Example 3

A white photoprinting base paper provided with a precoat of polyvinyl acetate and colloidal silicic acid is coated with the following solution:

| | |
|---|---|
| Citric acid _____ parts by wt__ | 4.0 |
| Boric acid _____ do____ | 3.0 |
| Aluminum sulfate _____ do____ | 6.0 |
| Zinc chloride double salt of the diazo compound of 1-amino-2,5-dimethoxy - 4 - toluyl-mercapto-benzene _____ parts by wt__ | 1.0 |
| Compound of Formula 2, the 2-(3'-hydroxyphenyl)-oxazoline _____ parts by wt__ | 1.0 |
| Concentrated hydrochloric acid _____ do____ | 4.0 |
| Water _____ parts by vol__ | 100.0 |

After exposure of the sensitized papers thus produced and development with gaseous ammonia, copies with yellow lines on a pure white background are obtained.

When the diazo compound mentioned above is replaced by the zinc chloride double salt of the diazo compound of 1-amino-2,5-diethoxy-4-benzoyl-aminobenzene, copies are obtained which show the same color shade.

Equally good results are obtained by replacing the compound corresponding to Formula 2 either by the compound corresponding to Formula 1, the 2-(2'-hydroxy-phenyl)-oxazoline, or by the compound corresponding to Formula 3, the 2-(4'-methyl-2'-hydroxyphenyl)-oxazoline, or by the compound corresponding to Formula 4, the 2-(4'-methoxy - 2' - hydroxy-phenyl)-oxazoline.

Example 4

A white photoprinting base paper provided with a precoat of polyvinyl acetate and colloidal silicic acid is coated with a solution of:

| | |
|---|---|
| Citric acid ............................ parts by wt.. | 0.6 |
| Boric acid ............................. do.... | 3.5 |
| Sulfate of the diazo compound of 1-amino-2,5-diethoxy - 4 - (4' - ethoxy - phenyl) - benzene ............................ parts by wt.. | 2.0 |
| Water ............................ parts by vol.. | 100.0 | and is dried. A copying paper suitable for the semi-wet process is obtained. After exposure under a transparent original, the material is developed with the following solution:

| | |
|---|---|
| Trisodium citrate ................. parts by wt.. | 4.0 |
| Trisodium phosphate .................. do.... | 2.0 |
| Sodium borate ........................ do.... | 2.0 |
| Thiourea ............................ do.... | 4.0 |
| Sodium salt of 1-isopropylnaphthalene sulfonic acid ............................ parts by wt.. | 0.2 |
| Compound of Formula 9, the 2-[6'-hydroxy-naphthyl(2')]-oxazoline ........ parts by wt.. | 1.2 |
| Glycol monomethyl ether ........ parts by vol.. | 10.0 |
| Water ............................ do.... | 100.0 |

Copies with violet-red lines on a pure white background are obtained.

Equally good results are obtained when the zinc chloride double salt of the diazo compound of 1-amino-2,5-diethoxy-4-toluylmercapto-benzene is used instead of the above-mentioned diazo compound.

Instead of the compound corresponding to Formula 9, the developer solution may also contain the compound corresponding to Formula 10, the 2-[6'-methoxy-2'-hydroxy-naphthyl(3')]-oxazoline.

From the above description it will be apparent that the substituted aryl oxazoline compounds of the present invention may be used in a two-component diazo coating for dry development processes or the substituted aryl oxazolines of the present invention may be used in the alkali developer for one component diazo coatings.

It will be apparent that changes may be made in the practice of the invention as defined by the valid scope of the claims.

| Formula No. | Formula | Melting Point, Degrees | Melting Point of the Ethanolamide used as a Starting Material, Degrees |
|---|---|---|---|
| 1 | (structure, HCl-Salt) | 159 | 112 |
| 2 | (structure) | 188 | 100 |
| 3 | (structure) | 95-96 | 50-51 |
| 4 | (structure) | 95 | 81-82 |
| 5 | (structure) | 200-201 | 157 |
| 6 | (structure) | 215-216 | 180 |
| 7 | (structure, HCl-Salt) | 233-235 | 176 |
| 8 | (structure) | 154 | 145-146 (Diacetoxy Compound) |
| 9 | (structure) | 200 | 205 |
| 10 | (structure) | 192 | 115 |
| 11 | (structure) | 205-206 | 184-185 |

| Formula No. | Formula | Melting Point, Degrees | Melting Point of the Ethanolamide used as a Starting Material, Degrees |
|---|---|---|---|
| 12 | 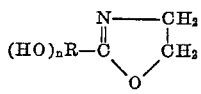 | 173–174 | 140–141 |
| 13 | 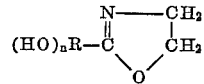 | 182 | 210–213 |

What is claimed is:

1. Diazotype material comprising a support and a composition theeron comprising: (a) a light-sensitive p-amino-benzene diazonium compound; and (b) a coupler component having the general formula:

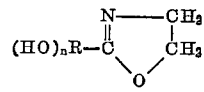

wherein R is a benzene or naphthalene derivative; and n is 1 or 2.

2. Material according to claim 1 wherein said coupler component is 2-[2'-hydroxy-naphthyl(3')]-oxazoline.

3. Material according to claim 1 wherein said coupler component is 2-[2',8' - dihydroxy-naphthyl(3')]-oxazoline.

4. Material according to claim 1 wherein said coupler component is 2-[8'-methoxy-2'-hydroxy-naphthyl(3')]-oxazoline.

5. Material according to claim 1 wherein said coupler component is 2-(3',5'-dihydroxyphenyl)-oxazoline.

6. Material according to claim 1 wherein said coupler component is 2-(4'-methyl-2'-hydroxyphenyl)-oxazoline.

7. Material according to claim 1 wherein said coupler component is 2-(4'-methoxy-2'-hydroxyphenyl)-oxazoline.

8. A diazotype process comprising:
(a) exposing a diazotype material imagewise to actinic light, said diazotype material comprising a support bearing a composition comprising a light-sensitive p-amino-benzene diazonium compound; and
(b) developing to form an azo dye image in the unexposed areas by contacting said material with an alkaline composition comprising a coupler component of the general formula $$(HO)_nR-\underset{\underset{O}{\diagdown\diagup}}{\overset{N-CH_2}{\underset{\|}{C}}}\overset{CH_2}{\underset{}{|}}$$

wherein R is a benzene or naphthalene derivative; and n is 1 or 2.

9. The process according to claim 8 wherein said coupler component is 2-[6'-hydroxy-naphthyl(2')]-oxazoline.

10. The process according to claim 8 wherein said coupler component is 2-[6'-methoxy-2'-hydroxy-naphthyl(3')]-oxazoline.

11. In the development of azo dye images in one-component and two-component diazotype materials, said diazotype material comprises a support bearing a composition comprising a p-amino-benzene diazonium compound, wherein after an imagewise exposure to light to decompose said diazonium compound, a positive azo dye image is formed by coupling said diazonium compound and an azo-coupling component in an alkaline environment, the improvement which comprises utilizing as the azo-coupling component, a compound of the general formula:

$$(HO)_nR-\underset{\underset{O}{\diagdown\diagup}}{\overset{N-CH_2}{\underset{\|}{C}}}\overset{CH_2}{\underset{}{|}}$$

wherein R is a benzene or naphthalene derivative; and n is 1 or 2.

12. The invention according to claim 11 wherein R is phenyl, naphthyl, substituted phenyl, or substituted naphthyl, the substituents being methyl, methoxy or halogen.

References Cited

UNITED STATES PATENTS

| 2,536,398 | 1/1951 | Slifkin | 96—91 |
| 2,714,082 | 7/1955 | Davies et al. | 260—307.6 |
| 2,901,473 | 8/1959 | Steinemann | 260—307.6 |

NORMAN G. TORCHIN, Primary Examiner

C. BOWERS, Assistant Examiner

U.S. Cl. X.R.

96—91; 260—307.6